United States Patent
Jia et al.

(10) Patent No.: US 7,479,924 B2
(45) Date of Patent: Jan. 20, 2009

(54) FALSE REACQUISITION MITIGATION IN HIGH SENSITIVITY NAVIGATIONAL SATELLITE SIGNAL RECEIVERS

(75) Inventors: Zhike Jia, San Jose, CA (US); Shridhara A. Kudrethaya, Cupertino, CA (US); Chi-Shin Wang, Half Moon Bay, CA (US)

(73) Assignee: SiRF Technology Holdings, Inc., San Jose, CA (US)

( * ) Notice: Subject to any disclaimer, the term of this patent is extended or adjusted under 35 U.S.C. 154(b) by 155 days.

(21) Appl. No.: 11/274,054

(22) Filed: Nov. 14, 2005

(65) Prior Publication Data

US 2007/0109189 A1    May 17, 2007

(51) Int. Cl.
*G01S 1/00* (2006.01)
*H04B 1/00* (2006.01)

(52) U.S. Cl. .................. 342/357.12; 375/150
(58) Field of Classification Search .............. 342/357.01–357.17; 375/150, 224, 345
See application file for complete search history.

(56) References Cited

U.S. PATENT DOCUMENTS

| | | | | |
|---|---|---|---|---|
| 5,291,081 A * | 3/1994 | Takeuchi et al. | ............... | 327/47 |
| 5,500,872 A * | 3/1996 | Kinney et al. | ............... | 375/150 |
| 5,577,025 A * | 11/1996 | Skinner et al. | ............... | 370/209 |
| 6,392,590 B1 * | 5/2002 | Kagemoto | ............. | 342/357.06 |
| 6,480,150 B2 * | 11/2002 | Falk et al. | ............... | 342/357.12 |
| 6,519,276 B1 * | 2/2003 | Kim et al. | ................ | 375/148 |
| 6,529,850 B2 * | 3/2003 | Wilborn et al. | ............. | 702/142 |
| 6,643,320 B1 * | 11/2003 | Wilcox et al. | ............... | 375/150 |
| 6,693,882 B1 * | 2/2004 | Gu et al. | ................ | 370/252 |
| 6,760,360 B1 * | 7/2004 | Kawai | ................ | 375/130 |
| 6,792,037 B2 * | 9/2004 | Meyer et al. | ............... | 375/150 |
| 6,812,887 B2 * | 11/2004 | Syrjarinne et al. | ..... | 342/357.12 |
| 7,245,893 B1 * | 7/2007 | Husted et al. | ............... | 375/345 |
| 2002/0015439 A1 * | 2/2002 | Kohli et al. | ................ | 375/148 |
| 2002/0015456 A1 * | 2/2002 | Norman et al. | ............. | 375/340 |
| 2002/0169550 A1 * | 11/2002 | Perlmutter et al. | .......... | 701/213 |
| 2003/0026363 A1 * | 2/2003 | Stoter et al. | ................ | 375/345 |
| 2003/0039221 A1 * | 2/2003 | Yamada | ..................... | 370/320 |
| 2003/0118086 A1 * | 6/2003 | Pietila et al. | ............... | 375/150 |
| 2003/0219084 A1 * | 11/2003 | Parker | ........................ | 375/343 |
| 2003/0231704 A1 * | 12/2003 | Tanaka et al. | ............... | 375/150 |
| 2004/0156426 A1 * | 8/2004 | Motoyoshi et al. | .......... | 375/150 |
| 2004/0208138 A1 * | 10/2004 | Hayashi et al. | ............. | 370/286 |

(Continued)

*Primary Examiner*—Thomas H Tarcza
*Assistant Examiner*—Harry Liu
(74) *Attorney, Agent, or Firm*—Pillsbury Winthrop Shaw Pittman LLP (57) ABSTRACT

The techniques to detect and mitigate the false reacquisition in a global satellite navigation receiver are disclosed. The false reacquisition due to frequency side-lobes and code auto-correlation secondary lobes are considered for mitigation. A set of two threshold values is used to detect correct reacquisition and reject false reacquisition. While the reacquisition of the signal is straight forward when the correlation is clear with the power above the first threshold, it is not so clear when the power is between two thresholds. So a further search for the maximum power among the retained dwells results in correct reacquisition. The search range depends upon the signal blockage interval and receiver dynamics. The feedback from navigational solution may be used to determine the search range both in frequency and code phase. In the case of frequency side-lobes, which occur only at specified frequency components, these frequencies are tested for maximum power response. The code side-lobes have similar characteristics and can be distinguished by the actual peak.

34 Claims, 7 Drawing Sheets

U.S. PATENT DOCUMENTS

| | | | |
|---|---|---|---|
| 2005/0018759 A1* | 1/2005 | Underbrink et al. | 375/152 |
| 2005/0276311 A1* | 12/2005 | Brajal et al. | 375/140 |
| 2006/0039453 A1* | 2/2006 | Yamada | 375/150 |
| 2006/0071851 A1* | 4/2006 | Graas et al. | 342/357.14 |
| 2006/0072658 A1* | 4/2006 | Yasuda et al. | 375/238 |
| 2006/0072689 A1* | 4/2006 | Kim et al. | 375/343 |
| 2006/0178163 A1* | 8/2006 | Richards et al. | 455/522 |

* cited by examiner

FALSE REACQUISITION MITIGATION IN HIGH SENSITIVITY NAVIGATIONAL SATELLITE SIGNAL RECEIVERS

FIELD OF THE INVENTION

The present invention relates generally to navigational signal receivers. More specifically, it relates to techniques for high sensitivity receivers to mitigate the rate of false reacquisition of signals from navigational system satellites.

BACKGROUND OF THE INVENTION

The global positioning system (GPS) is a satellite-based radio-navigation system built and operated by the United States Department of Defense. The system uses twenty-four or more satellites orbiting the earth at an altitude of about 11,000 miles with a period of about twelve hours. These satellites are placed in six different orbits such that at any time a minimum of six satellites are visible at any location on the surface of the earth except in the polar region. Each satellite transmits a time and position signal referenced to an atomic clock. A typical GPS receiver locks on to this signal and extracts the data contained in it. Using signals from a sufficient number of satellites, a GPS receiver can calculate its position, velocity, altitude, and time. The Russian operated global navigation satellite system (GLONASS) and the European Galileo positioning system are the two other important satellite-based navigational systems.

The GPS receivers can operate in many modes. In a "hot start" mode, the receiver already has stored in its memory the time, its last position, and the information on satellite position (also known in the art as almanacs and ephemeris). The receiver can use this stored information to determine which satellites are probably visible, and it can then lock on to those satellite signals in a short time. On the other hand, the receiver may have no prior data on its position, time, or almanacs stored. In this "cold start" mode, the receiver has to search for signals from all of the satellites present in the constellation. There are some other modes where partial information on time, position and almanacs are available and the corresponding start mode is known as "warm start."

The GPS receiver has to acquire and lock on to at least four satellites in order to derive the position and time. Usually, a GPS receiver has many parallel channels, each receiving signals from one visible GPS satellite. The acquisition of the satellite signals involves a two-dimensional search of carrier frequency and the pseudo-random number (PN) code phase. Each satellite transmits signals using a unique 1023-chip long PN code, which repeats every millisecond. The receiver locally generates a replica carrier to wipe off residue carrier frequency and a replica PN code sequence to correlate with the digitized received satellite signal sequence. During acquisition stage, the code phase search step is a half-chip for most satellite navigational signal receivers. So the full search range of code phase includes 2046 candidate code phases spaced by a half-chip interval. The carrier frequency search range depends upon the Doppler frequency due to relative motion between the satellite and the receiver. Additional frequency variation may result from local oscillator instability.

Once the satellite signal has been acquired, the receiver continues tracking the signal. At the same time, the receiver extracts the modulated navigation data from the signal being tracked. This tracking of the signal involves tracking the change in replica frequency relative to the received signal. This includes adapting the local replica frequency to the Doppler variation of the received signal. This Doppler frequency continuously changes with time as a function of the satellite position and receiver velocity. Under some conditions, such as traveling in a tunnel, the input signal may be blocked for a length of time. Consequently, the receiver may lose signal tracking for a brief period. When the satellites are visible again, the receiver starts reacquiring the satellite signal. This reacquisition time, however, can be much shorter than the time required for initial acquisition of the signal. After such a brief lapse, the search space in both frequency and code phase domain is smaller because the position, time and satellites information (such as ephemeris, almanac, etc.) may be assumed to be close to their previous values. Based on this information the carrier frequency and code phase can be precisely predicted. However, the correct code phase may differ from the predicted value by a small number of chips, depending on the duration of the signal block-out period. The corresponding frequency deviation is also small. The process of acquiring the signal in this case is known as reacquisition. The signal search range of reacquisition depends upon the duration of the signal loss and receiver dynamics.

It should be noted that during the reacquisition process, especially for high sensitivity receivers, the reacquisition might be a false reacquisition due to a lock on to the correlation side-lobes (false PN code phase) or to frequency side lobes (false carrier frequency). In this case, the bit synchronization and hence the navigation data extraction may not be possible, or incorrect data extraction may result with an associated large bit error rate.

The prior art has focused primarily on navigational signal acquisition techniques under various signal power conditions rather than techniques that address the specific problems associated with reacquisition. The U.S. Pat. No. 6,643,320 teaches that the expected signal power level is set to the level prior to the interruption. The U.S. Pat. No. 6,480,150 uses hardware for tracking. U.S. patent application No. 20020015439 teaches a 11-half-chip based reacquisition technique. U.S. patent application No. 20020169550 teaches a reacquisition technique using a supplementary internal guidance system. U.S. patent application No. 20030118086 teaches reacquisition using dual correlators having distinct correlation times.

Accordingly, there is a need in the art for an efficient reacquisition technique, which avoids the false lock on the auto-correlation side-lobes or on the frequency side-lobes.

SUMMARY OF THE INVENTION

According to one aspect, techniques to detect and mitigate false reacquisition in a navigation receiver are disclosed. In particular, techniques address false reacquisition due to frequency side-lobes and PN code autocorrelation secondary lobes. Based on characteristics of frequency side-lobes and PN code autocorrelation secondary lobes, independent searches for correct carrier frequency and PN code phase can be made. First the PN code phase is determined, and then the frequency deviation for the given code phase may be determined. A two-threshold strategy is preferably used. One threshold is with a high value while the other is with a low value. The value of the high threshold is a function of the received signal strength while the value of the low threshold is based on the receiver sensitivity. In the navigation scenarios under consideration, the frequency side-lobes occur only at specified frequencies and only these frequencies are checked for maximum power response at a given code phase. The highest power level of the frequency side-lobe is about 13.5 dB below the main lobe. The code autocorrelation side-lobes have similar characteristics and can be distinguished by the main peak. The maximum secondary correlation power is about 24 dB below the peak autocorrelation value. These wide power differences help in easily identifying the correct dwell (i.e., correct carrier frequency and code phase values). In the preferred method, if the maximum power at every dwell is lower than the high threshold but at least one power value at some dwell is greater than the low threshold, then the true dwell is searched among different frequency side-lobes of selected dwells to avoid false reacquisition.

DETAILED DESCRIPTION

Figure 1:
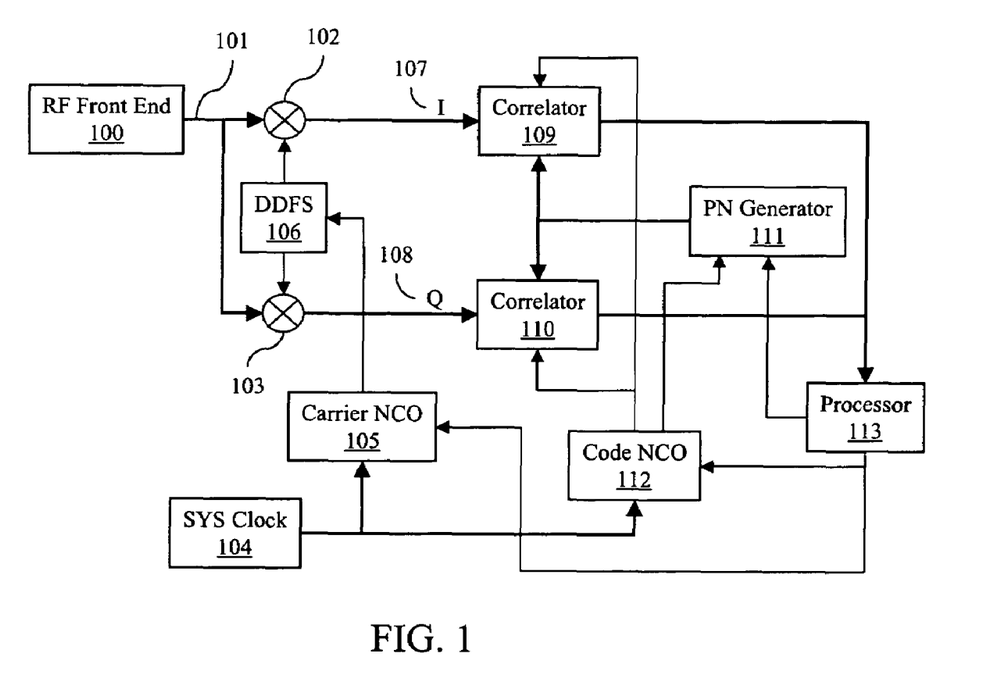
FIG. 1 is a block diagram illustrating a GPS baseband section according to an embodiment of the present invention.

A receiver according to an embodiment of the present invention is illustrated in FIG. 1. An intermediate frequency (IF) signal input 101 enters a baseband section of the receiver from an analog-to-digital converter (ADC) output of a conventional RF front-end 100. The IF input is multiplied in IF mixers 102 and 103 in-phase and in quadrature, respectively, with a local frequency signal generated by a direct digital frequency synthesizer (DDFS) 106. This mixing involves multiplying the ADC output 101 by the local DDFS frequency in-phase which generates the in-phase (I) component 107. In a parallel path the same signal 101 is multiplied by the DDFS frequency in quadrature (i.e., with a phase shift of 90 degrees) to produce quadrature (Q) component 108. The DDFS 106 is driven by a carrier numerically controlled oscillator (NCO) 105. In addition, carrier NCO 105 receives phase and frequency corrections from a processor 113. Because of this correction, the DDFS frequency and phase is almost the same as that of ADC output 101. Thus the I and Q signals produced by the IF mixers 102 and 103 are near zero carrier frequency. The I and Q signals may be low-pass filtered to remove the high frequency components which are equal to twice the IF frequency band.

The I and Q components 107 and 108 are correlated in correlators 109 and 110, respectively, with a locally-generated PN sequence generated by a PN generator 111. The PN-sequence corresponds to the channel being processed by the baseband section at that time. The PN sequence generator is driven by code NCO 112. The local code generator frequency is made equal to the code rate of I and Q paths by corrective feedback from processor 113 to the code NCO 112. In addition, processor 113 sends a signal to PN code generator 111 to set the starting phase of the locally generated code. The NCO 112 provides the correct clock signals to correlators 109 and 110. For example, NCO 112 provides a clock signal to generate two samples per PN chip in the signal acquisition stage and three samples per chip during the tracking stage. SYS CLK 104 provides to NCO 105 and NCO 112 a common clock synchronization signal. The correlator output values are then sent to processor 113 at every millisecond interval. The processor 113 may be a digital signal processor (DSP) core. Subsequent processing of the signals takes place in the processor 113, as will be described in detail below. Additional details of the receiver baseband section described above are contained in U.S. patent application Ser. No. 11/123,861 filed May 6, 2005, which is incorporated herein by reference.

The DSP core 113 receives one millisecond integrated (correlated) I and Q values from the GPS baseband section described above. In order to acquire a GPS signal in the DSP processor, all dwells (i.e., pairs of carrier frequency and code phase values) are searched. It is a two-dimensional search. Coherent integration and non-coherent integration are two commonly used integration methods to acquire GPS signals. Coherent integration provides better signal gain at the cost of larger computational load, for equal integration times.

Signal acquisition is the process of locking on to a signal for the first time. Signal reacquisition on the other hand is the process of reacquiring the signal usually after a brief interruption. Reacquisition involves a two-dimensional search in both carrier frequency and code phase space. With the improvement of acquisition sensitivity of GPS receiver, the possibility of false reacquisition is higher due to the low acquisition threshold. The three main causes of false reacquisition are cross-correlation with interfering signals and the presence of side lobes of autocorrelation or carrier frequency. The cross-correlation is caused by interference with signals from other satellites while the side lobes are part of the same satellite signal. The techniques disclosed here focus primarily on the problem of false reacquisition due to the side lobes of carrier frequency or side lobes of PN code autocorrelation. In the following sections, the characteristics of side lobes of code autocorrelation and frequency are given and then the methods to mitigate the false reacquisition based on these characteristics are described.

The spreading code used by GPS for standard positioning is a form of pseudo-random code known as the Gold code. The autocorrelation of the Gold code with infinite length is given by the following autocorrelation function:

$$AutoCor(n) = \begin{cases} +\infty & n = 0 \\ -1 & n \neq 0 \end{cases} \quad (1)$$

where n is a discrete time index. However, in practical GPS applications, the length of the C/A code is not infinite. Instead, the length is 1023 and its period is one millisecond. Consequently, the autocorrelation function is modified as follows:

$$AutoCor(n) = \begin{cases} 1023 & n = 0 \\ 63, -1, \text{ or } -65 & 0 < n < 1023 \end{cases} \quad (2)$$

Figure 2:
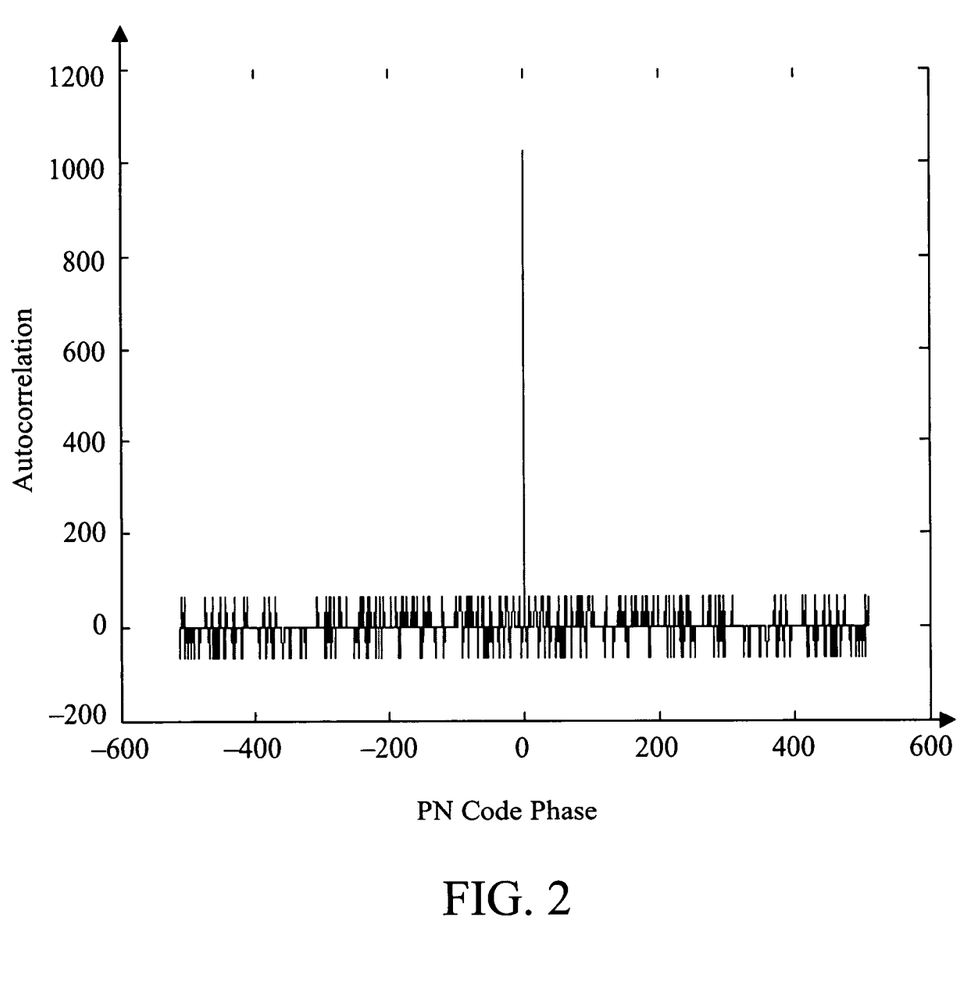
FIG. 2 is an autocorrelation plot of the PN code for SV 2 ($-512 \leq n \leq 511$).
Figure 3:
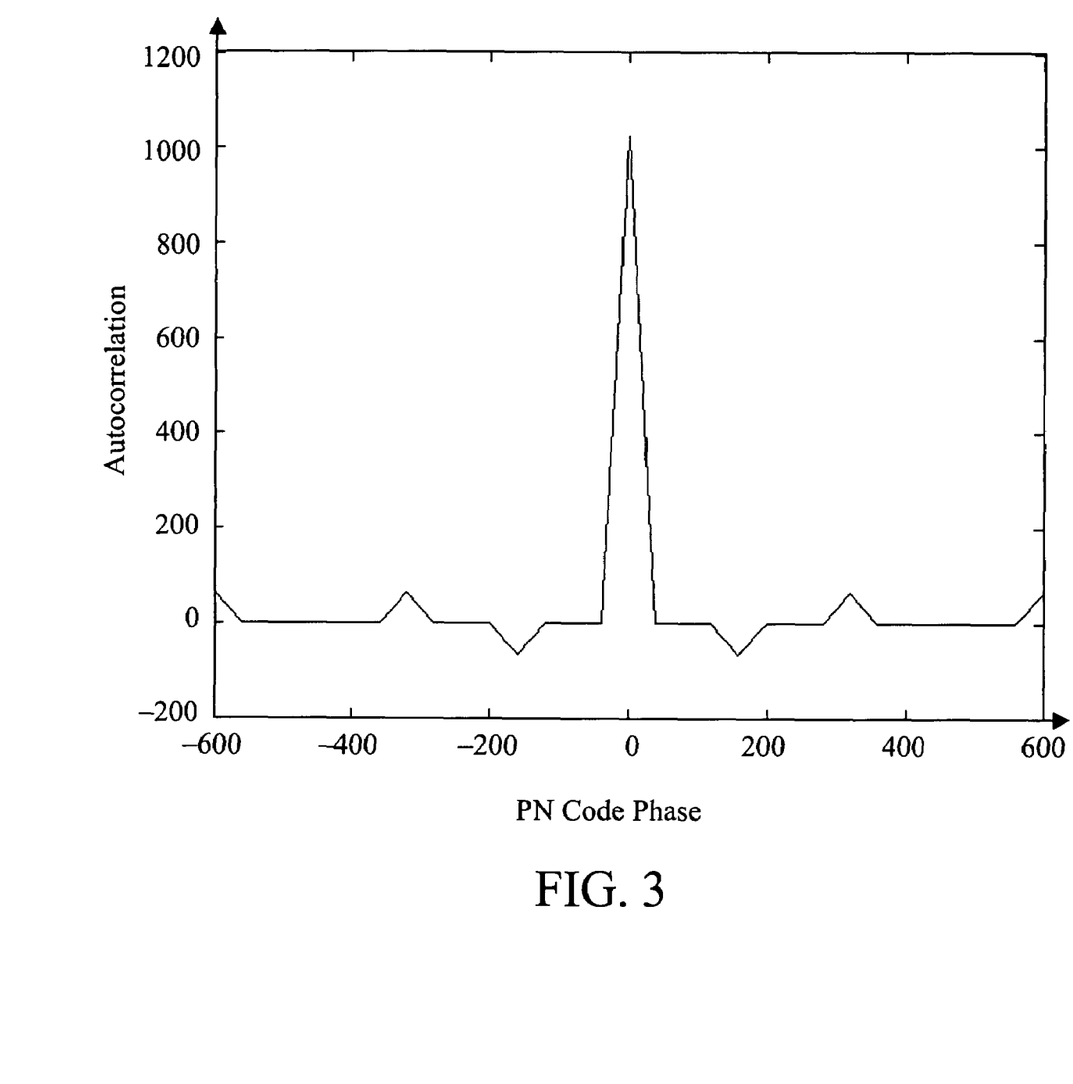
FIG. 3 is a plot of a part of the autocorrelation values of the Gold code for SV 2 ($-15 \leq n \leq 15$).

It is clear that the peak of autocorrelation main lobe is 1023 while those of side lobes are 63 or 65. The possibility of the occurrence of side lobes is about 25%. As shown in FIG. 2, there is a significant power difference between the main peak amplitude and the next minor peak amplitude. FIG. 3 is a magnified view of the main lobe and its adjacent secondary lobes. Specifically, the power difference between the main lobe and secondary lobes is about 24 dB (since $10 \log_{10}(1023^2/65^2) \approx 24$ dB). Thus, if the carrier frequency is precise, the reacquisition threshold should be 24 dB lower than the power level of the main peak for a false reacquisition to occur. On the other hand, if the code phase is correct, the power difference between the carrier frequency main lobe and the first several carrier frequency side lobes is higher than that of code phase autocorrelation. Table 1 lists the levels of the carrier frequency side-lobe amplitudes and powers with respect to the peak or main lobe amplitude and power.

TABLE 1

AMPLITUDES AND POWER LEVELS OF FREQUENCY SIDE-LOBES WITH RESPECT TO THOSE OF MAIN CARRIER FREQUENCY LOBE

|  | Central Frequency Offset | Amplitude Level | Power Level |
|---|---|---|---|
| Side Lobe 1 | 1500 Hz | 0.212 | −13.5 dB |
| Side Lobe 2 | 2500 Hz | 0.127 | −17.9 dB |
| Side Lobe 3 | 3500 Hz | 0.0909 | −20.8 dB |
| Side Lobe 4 | 4500 Hz | 0.0707 | −23.0 dB |
| Side Lobe 5 | 5500 Hz | 0.0579 | −24.8 dB |

Figure 4:
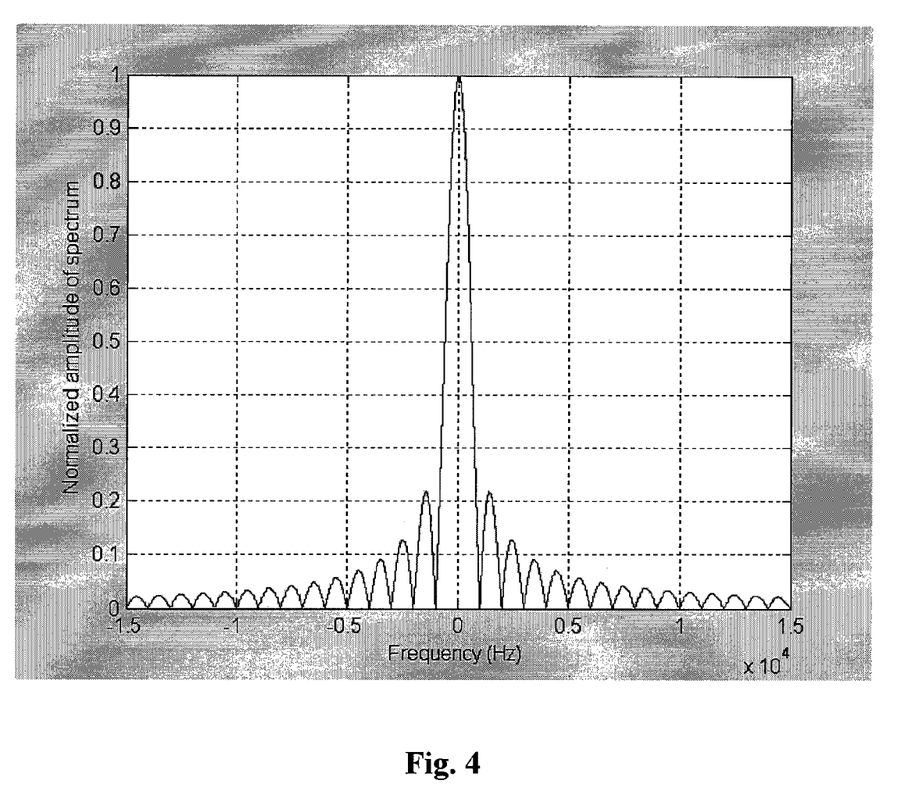
FIG. 4 is a plot of normalized amplitude of the spectrum of C/A codes.

The spectrum of 1-millisecond correlation result of C/A codes is the sin c function, also called the sampling function, defined by $$\operatorname{sinc}(x) = \begin{cases} 1 & \text{for } x = 0 \\ \dfrac{\sin x}{x} & \text{for } x \neq 0 \end{cases} \quad (3)$$

The normalized amplitude of the spectrum is shown in FIG. 4. The amplitudes of frequency components beyond 15 kHz are not shown because of their low values. It is clear that besides the main lobe, the frequency interval between adjacent side lobes is 1000 Hz. The peak powers of side-lobes decrease quickly with distance away from the main lobe.

Figure 5:
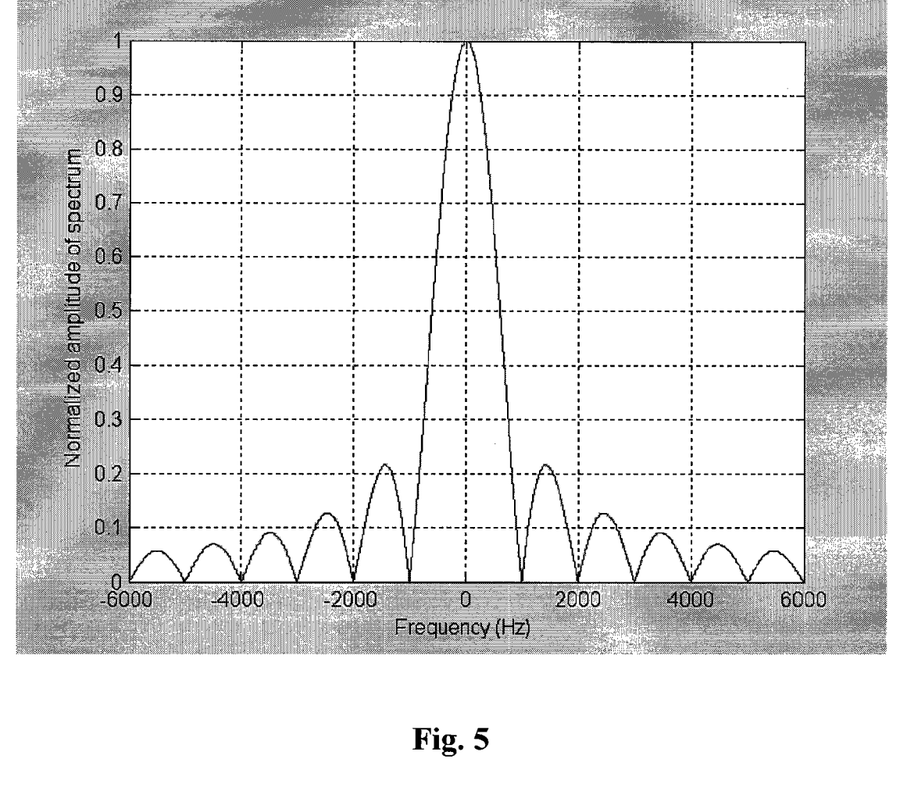
FIG. 5 is a plot of normalized amplitude of the spectrum of C/A codes within ±3000 Hz.

Even in the case of a high sensitivity receiver, the frequency components beyond the sixth side-lobe cannot be acquired because of their low power levels. That is, only five side lobes of each side or ten side lobes of both sides need to be considered during reacquisition. The corresponding frequency range is ±6 kHz. The normalized amplitude of the spectrum within that range is shown in FIG. 5.

For example, the received signal strength from one satellite is −150 dBW (i.e., $10^{-15}$ Watt), which is the power level of the main lobe. The peak power of the fifth frequency side lobe with correct PN code phase and the second code phase peak with the correct carrier frequency are both about −175 dBW. There is a larger probability of acquiring other carrier frequency side lobes closer to the main lobe because of the relatively higher signal power levels of these frequency side lobes. In high sensitivity receivers, the power threshold for reacquisition must be low enough to allow acquisition of very low power signals. However, if the peak power in one frequency or code autocorrelation side lobe is greater than this low threshold, reacquisition might be declared. But it is a false reacquisition as the signal is locked on the side lobes.

To avoid this kind of false reacquisition, the present techniques continue the search even after detecting a first peak greater than the low threshold. The remaining possible combinations of carrier frequency and code phase may also be tested, which is called a confirmation process. However, it is very time consuming to complete a full search within the search range. So, to speed up the reacquisition, a selective testing based on the properties of PN code autocorrelation and carrier frequency spectrum is preferably used.

These properties are listed below.

Property 1:

The power difference between the main lobe of PN code autocorrelation and the secondary peak is about 24 dB while that between the carrier frequency main lobe and the first side lobe is about 13.5 dB. Thus, it is easier to distinguish the main lobe of PN code autocorrelation from its side lobes than to distinguish the carrier frequency main lobe from its side lobes. Furthermore, even if the local carrier frequency replica is locked on to one of its side lobes, the signal can still be acquired with correct code phase. Thus, the code phase can be determined in the first step and then the correct carrier frequency can be determined so that the two-dimensional search can be reduced to a single dimensional search. This search strategy can lower both the computation load and search time.

Property 2:

FIG. 4 and FIG. 5 show frequency side-lobe power reduction with distance away from the main lobe. That is, the closer to the frequency main lobe, the greater the peak power of the frequency side lobes. Consequently, the frequency convergence direction to the main lobe, (i.e., to the correct carrier frequency) can be determined, and it is sufficient to check frequencies in one direction. For example, if the peak power at +1000 Hz frequency offset is larger than the peak power at the current frequency (0 Hz), a search path in the positive direction (e.g., +1000 Hz, +2000 Hz, . . . , +5000 Hz) may be used. On the other hand, if the peak power at −1000 Hz frequency offset is larger than the peak power at current frequency (0 Hz), a search path in the negative direction (e.g., −1000 Hz, −2000 Hz, . . . , −5000 Hz) may be used. By identifying the frequency search direction, the search range can be reduced by half.

Property 3:

The adjacent side lobe central frequencies are all separated by 1000 Hz while the center of the main lobe is separated from the center of the first side lobe by 1500 Hz. Thus, in the confirmation stage of reacquisition, not all of the frequencies in the frequency search range need be searched. Instead, only neighboring frequencies at 1000 Hz and 1500 Hz away need be tested for possible higher powers.

Figure 6:
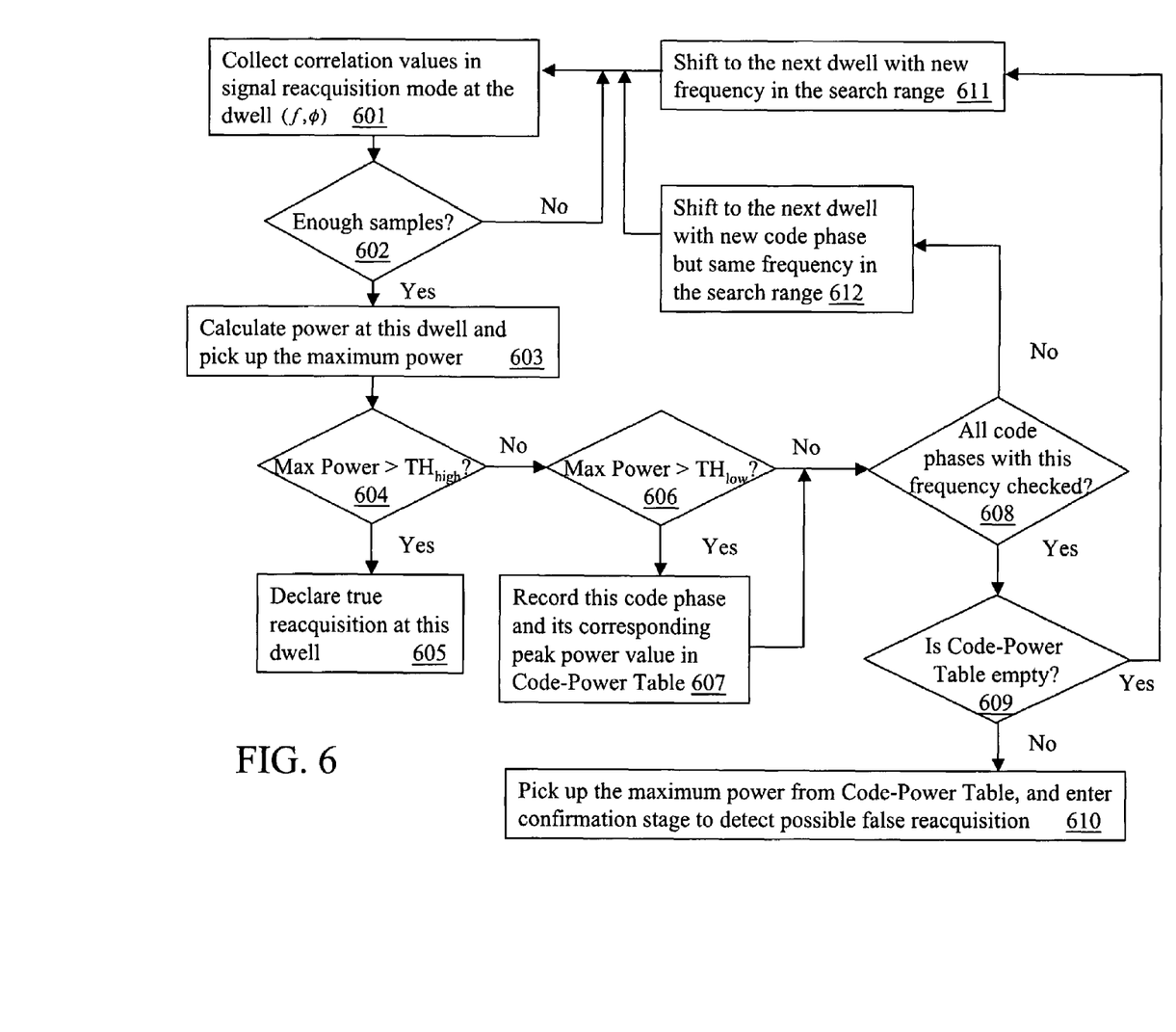
FIG. 6 illustrates a procedure of reacquisition according to an embodiment of the present invention.

FIG. 6 is a flowchart, which illustrates a reacquisition process according to one embodiment of the invention. As a first step, the process collects enough one millisecond correlation samples as illustrated by the block 601 and logic step 602. The power of each frequency component at this dwell (set of values for carrier frequency f and code phase φ) is computed using a fast Fourier Transform (FFT) and the resulting peak power is stored in memory. This is shown in block 603. The reason for frequency analysis is to check more than one frequency component every time. These frequency components are within 500 Hz centered at the carrier frequency f of this dwell. In the logic block 604 the resulting power is compared with a pre-computed high threshold $TH_{high}$. If the power is greater than this threshold, the reacquisition is assumed to be correct at this dwell and the reacquisition process is completed without further confirmation. This operation is shown in block 605. On the other hand, if the max power is lower than the high threshold $TH_{high}$ but higher than another pre-computed low threshold $TH_{low}$ as shown in the logic block 606, the power value and the corresponding code phase are recorded in a Code-Power table as shown in block 607. All the power entities in the table are between $TH_{high}$ and $TH_{low}$. An example of the determination of these two threshold values is given later in this description. Whether the power is greater than or lower than $TH_{low}$, all possible code phases in the code phase search range are compared with the two thresholds holding the same carrier frequency f, as shown in logic block 608. If there are still some code phases not searched, all these remaining code phases need to be searched as indicated in 612. After all code phases have been searched, block 609 checks whether Code-Power table is empty or not. If it is empty (i.e., there is no signal in the current carrier frequency), a search is restarted with next dwell with a new frequency in the search range as shown in 611. On the other hand, if the Code-Power table is not empty, then the correct code phase can be determined by selecting the code phase with maximum power in the Code-Power table. A further confirmation procedure is employed to detect possible false reacquisition as given in block 610. This stage is further illustrated in the flowchart of FIG. 7.

If all the code phases and frequencies have been searched and no confirmation can be arrived at, the search range of reacquisition has to be widened after a time-out.

Figure 7:
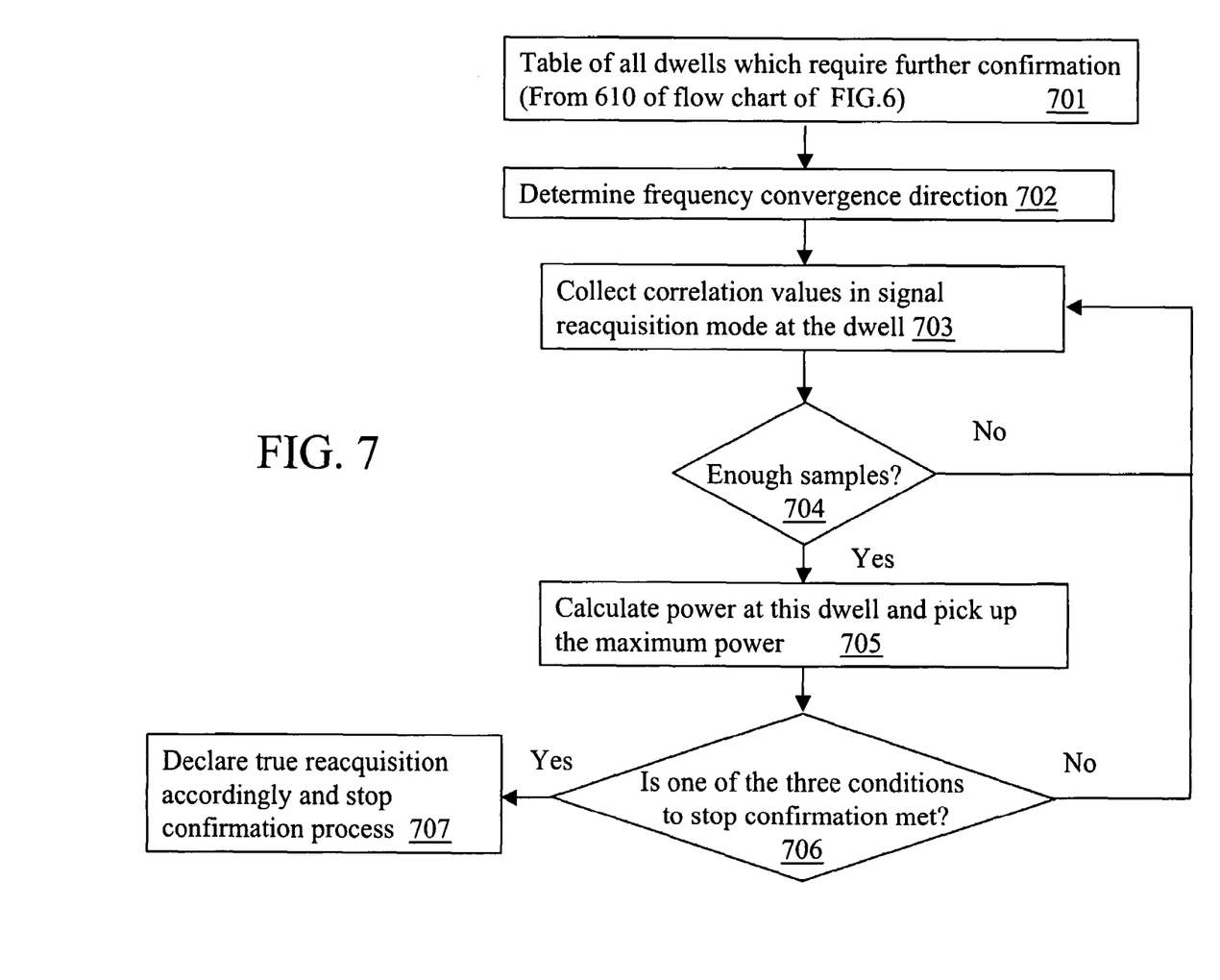
FIG. 7 illustrates a procedure of confirmation to avoid false frequency side lobes or code phases according to an embodiment of the present invention.

FIG. 7 is a flowchart illustrating the logic flow of the carrier frequency confirmation process after the code phase has been determined. Thus, block 701 in FIG. 7 is the same as the block 610 in FIG. 6. As shown in block 702, the frequency convergence direction to the main lobe is determined by testing the power levels of two adjacent frequencies in both directions. These two adjacent frequencies are obtained by increasing and decreasing the current frequency f by a fixed value equal to the frequency interval between two consecutive lobes. Out of the two frequencies, the one which has a higher value of peak power determines the direction of convergence. For example, based on the fact that the peak power of side lobe decreases as the frequency moves away from the main lobe, we can check the dwells of (f+1000 Hz, φ) and (f−1000 Hz, φ). The frequency search direction is determined by which of these two dwells has a higher peak power. Along the search direction, we check frequencies at the interval of 1000 Hz. At each possible frequency, enough samples are collected and then a maximum power component is picked up from the calculated powers. As shown in logic block 706, the confirmation stops when one of the following three conditions is met.

Condition 1:

The maximum power is greater than $TH_{high}$. True reacquisition is declared at this carrier frequency.

Condition 2:

The peak power of current frequency is less than that of the last frequency in the convergence direction. Under this condition, the last carrier frequency is the actual frequency.

Condition 3:

All the possible frequencies in the frequency search range are checked. Under this condition, the last carrier frequency in this direction and within the frequency search range is declared to be the actual frequency.

Now we present two examples illustrating the methods to determine the two thresholds discussed earlier.

(1) $TH_{high}$: This threshold makes sure that the peak is the real main lobe instead of side lobes of frequency or autocorrelation of PN codes. That is, if the peak power is greater than $TH_{high}$, it is certain that the reacquisition in a current dwell (f, φ) is a true reacquisition and no further checking is needed. $TH_{high}$ is a function of the maximum received signal power. In this embodiment, the maximum received signal power after antenna and RF module is about −150 dBW, which corresponds to 52 dB-Hz with the 460° K noise temperature. Because the attenuation of first side-lobe with respect to the main lobe is about 13.5 dB, $TH_{high}$ is set to 39 dB-Hz. On the other hand, the code phase minor lobes are at a power level that is 24 dB below the actual correlation level. So, $TH_{high}$=39 dB-Hz is much above the maximum code correlation side-lobe level of 28 dB-Hz.

(2) $TH_{low}$: The threshold to make sure that the peak is not noise. That is, if the peak power is less than $TH_{low}$, it is certain that no signal or first several side lobes of the signal are in this dwell (f, φ). However, if the peak power is between $TH_{low}$ and $TH_{high}$, some signals are in this dwell (f, φ), but cannot be confirmed whether this is the primary signal or its side lobes. So later a confirmation process is adopted. $TH_{low}$ is determined based on the acquisition sensitivity of GPS receiver as well as the maximum received signal power. In this embodiment, the reacquisition sensitivity is −174 dBW or 28 dB-Hz. And the maximum received signal power after antenna and RF module is about −150 dBW, whose fifth frequency side lobe signal power and the secondary lobe of code autocorrelation are both about −174 dBW. If the signal strength is lower than this level, we cannot distinguish signal and noise. Thus $TH_{low}$ is set to 28 dB-Hz in this embodiment.

The reacquisition process should be much faster and more sensitive compared with acquisition. Since the carrier frequency and code phase are known before the signal is blocked, the carrier frequency and code phase can be estimated more precisely for reacquisition. As a result, both frequency search range and code phase search range can be within a small range. In one embodiment, the frequency search range is set to be ±6 kHz and the code phase search range is set to ±15 chips.

The search range for both frequency and code phase need not be constants, but may be adaptively adjusted based on the circumstances. The uncertainties of both frequency deviation and code phase offset increase with the duration of the signal blockage. When the blockage is for a short time interval, the code phase and frequency deviation is small and a smaller search range is sufficient. Furthermore, even if the navigational signal is blocked, the carrier frequency and code phase of the blocked satellite can be estimated through the results of a PVT (Position, Velocity and Time) computation. Usually, the accuracy of the PVT results is denoted by a quality factor. The drawback of the PVT based approach is that the results become less accurate with increase in blockage duration. In such cases, an approach based on the PVT results, the PVT result quality factor and receiver dynamics with the last parameter being obtained through some other means such as odometer, may be used.

A technique for confirming true reacquisition at a given PN code lobe involves measuring the number of chips to its adjacent PN code autocorrelation side-lobes. If, within a predetermined number of chips, there are one or more side lobes with similar correlation values as that of the lobe under consideration, then the reacquisition is not correct. This test is based on the fact that there are many PN code autocorrelation side-lobes with comparable autocorrelation values while only one autocorrelation main lobe exists with significantly larger autocorrelation value. Thus the presence within a predetermined number of chips of more than one lobe with approximately the same autocorrelation value indicates that the main autocorrelation lobe has not been identified. For example, suppose a side-lobe with autocorrelation value 63 is obtained for a code phase of n and another side-lobe with autocorrelation value 61 (63 with noise) is obtained at n+42. Then the lobe at code phase n represents incorrect reacquisition. One of the properties of the Gold code of length 1023 is that the maximum distance between two adjacent side lobes (i.e., lobes with values 63 or −65) is less than about 50 chips. Thus, if there are no two side-lobes within 50 chips, the correlation obtained may be assumed to be a correct reacquisition. A predetermined variation in the autocorrelation values of the side lobes may be used when identifying side lobes. For example, if the variation is within 10%, the two side lobes may be assumed to be the same.

In another embodiment, the threshold $TH_{high}$ may be determined using an alternate method. For example, the threshold may be derived for each channel by computing a function of the power of the signal of that particular channel as measured just prior to the occurrence of signal blockage. In this method a short record of the signal-to-noise (SNR) ratio or power of the signal of a particular channel is maintained. This record can include, for example, signal power or SNR samples over a short time interval. The sampling time interval and the number of samples may depend upon the memory available, rate of signal power variation, etc. Thus this sampling rate and number of samples are predetermined or computed on the fly. A value for the high threshold $TH_{high}$ is then derived from the signal values maintained. This threshold may be, for example, the average value of the maintained values scaled by an appropriate constant greater than 1. The actual value of the constant is based on several trials. In one case, this value may be 1.2. The power of the received signal changes with time according to the distance of the satellite (assuming no blockage) and so instead of averaging the power of the signal it may be predicted at the time of reacquisition. This prediction may be simple linear or non-linear extrapolation of the maintained values. But any other type of extrapolation may also be used. The blockage is said to start when the signal power or signal-to-noise ratio experiences a large and sudden decrease, and these low values are not used in the above prediction.

Although the present invention has been described in terms of the presently preferred embodiments, it is to be understood that the disclosure is not to be interpreted as limiting. Various alterations and modifications will no doubt become apparent to those skilled in the art after having read this disclosure. For example, although the above embodiments have been described using the GPS system as an example, the techniques and methods may be used for other global satellite navigational systems including GLONASS, Galileo, secondary systems such as WASS, EGNOS, and MSAS, as well as hybrids of the above systems. Accordingly, it is intended that the appended claims be interpreted as covering all alterations and modifications as fall within the spirit and scope of the invention.

The invention claimed is:

1. A method for reacquisition of signals in a global satellite navigation receiver, the method comprising:
   collecting, for each carrier frequency and PN code phase dwell within a selected frequency range and selected code phase range, a sequence of correlation values derived from signals originating from a navigational satellite;
   declaring a valid reacquisition at a selected dwell if a maximum power of the selected dwell exceeds a pre-determined high threshold value;
   declaring a valid reacquisition at the selected dwell if the maximum power of the selected dwell is below the pre-determined high threshold value, the maximum power of the selected dwell is above a pre-determined low threshold value, and the maximum power of the selected dwell is above a maximum power of all other dwells in the selected frequency range and selected code phase range.

2. The method of claim 1 wherein the predetermined high threshold value is selected based on a maximum received signal power level.

3. The method of claim 1 wherein the predetermined low threshold value is selected based on a receiver sensitivity level.

4. The method of claim 1 wherein the collecting comprises performing a search of PN code phase values within the selected code phase range, followed by a search of carrier frequency values within the selected frequency range.

5. The method of claim 4 wherein the search of carrier frequency values comprises searching frequency values spaced 1000 Hz or 1500 Hz apart.

6. The method of claim 4 wherein the search of carrier frequency values comprises determining a frequency search direction toward a frequency main lobe.

7. The method of claim 4 wherein the search of carrier frequency values comprises searching carrier frequency values in a range based on feedback from a position, velocity and time (PVT) computation.

8. A method for reacquisition of signals in a global satellite navigation receiver, the method comprising:
   collecting, for each carrier frequency and PN code phase dwell within a selected frequency range and selected code phase range, a sequence of correlation values derived from signals originating from a navigational satellite, wherein the collecting comprises performing a search of PN code phase values within the selected code phase range, followed by a search of carrier frequency values within the selected frequency range, and wherein the search of carrier frequency values comprises searching carrier frequency values in a range based on a duration of signal blockage and receiver dynamics:
   declaring a valid reacquisition at a selected dwell if a maximum power of the selected dwell exceeds a pre-determined high threshold value; and
   declaring a valid reacquisition at the selected dwell if the maximum power of the selected dwell is below the pre-determined high threshold value, the maximum power of the selected dwell is above a predetermined low threshold value, and the maximum power of the selected dwell is above a maximum power of all other dwells in the selected frequency range and selected code phase range.

9. A method for reacquisition of signals in a global satellite navigation receiver, the method comprising:
   collecting, for each carrier frequency and PN code phase dwell within a selected frequency range and selected code phase range, a sequence of correlation values derived from signals originating from a navigational satellite, wherein the collecting comprises performing a search of PN code phase values within the selected code phase range, followed by a search of carrier frequency values within the selected frequency range, and wherein the search of carrier frequency values comprises searching carrier frequency values in a range based on duration of signal blockage, results of PYT computation, quality of the PVT results, and receiver dynamics;
   declaring a valid reacquisition at a selected dwell if a maximum power of the selected dwell exceeds a pre-determined high threshold value; and
   declaring a valid reacquisition at the selected dwell if the maximum power of the selected dwell is below the pre-determined high threshold value, the maximum power of the selected dwell is above a predetermined low threshold value, and the maximum power of the selected dwell is above a maximum power of all other dwells in the selected frequency range and selected code phase range.

10. The method of claim 4 wherein the search of PN code phase values comprises searching PN code phase values in a range based on feedback from a position, velocity and time (PVT) computation.

11. A method for reacquisition of signals in a global satellite navigation receiver, the method comprising:
    collecting, for each carrier frequency and PN code phase dwell within a selected frequency range and selected code phase range, a sequence of correlation values derived from signals originating from a navigational satellite, wherein the collecting comprises performing a search of PN code phase values within the selected code phase range, followed by a search of carrier frequency values within the selected frequency range, and wherein the search of PN code phase values comprises searching PN code phase values in a range based on duration of signal blockage and receiver dynamics;
    declaring a valid reacquisition at a selected dwell if a maximum power of the selected dwell exceeds a pre-determined high threshold value; and
    declaring a valid reacquisition at the selected dwell if the maximum power of the selected dwell is below the pre-determined high threshold value, the maximum power of the selected dwell is above a predetermined low threshold value, and the maximum power of the selected dwell is above a maximum power of all other dwells in the selected frequency range and selected code phase range.

12. A method for reacquisition of signals in a global satellite navigation receiver, the method comprising:
    collecting, for each carrier frequency and PN code phase dwell within a selected frequency range and selected code phase range, a sequence of correlation values derived from signals originating from a navigational satellite, wherein the collecting comprises performing a search of PN code phase values within the selected code phase range, followed by a search of carrier frequency values within the selected frequency range, and wherein the search of PN code phase values comprises searching PN code phase values in a range based on duration of signal blockage, results of PVT computation, quality of the PVT computation results, and receiver dynamics;
    declaring a valid reacquisition at a selected dwell if a maximum power of the selected dwell exceeds a pre-determined high threshold value; and
    declaring a valid reacquisition at the selected dwell if the maximum power of the selected dwell is below the pre-determined high threshold value, the maximum power of the selected dwell is above a predetermined low threshold value, and the maximum power of the selected dwell is above a maximum power of all other dwells in the selected frequency range and selected code phase range.

13. The method of claim 1 further comprising determining the maximum power of the selected dwell by performing a frequency domain transformation of the sequence of correlation values for the selected dwell, and identifying a frequency domain component with maximum power.

14. The method of claim 1 further comprising confirming a valid reacquisition at the selected dwell if there is no PN code autocorrelation side lobe within a predetermined number of chips from the selected dwell.

15. The method of claim 1 wherein the high threshold value is derived from a power value of the signals prior to signal blocking.

16. The method of claim 1 wherein the high threshold value is derived from a predicted power value computed from a short term average power level of the signals prior to signal blocking.

17. The method of claim 1 wherein the high threshold value is derived from a predicted power value computed by extrapolating power levels of the signals prior to blockage.

18. A global satellite navigation receiver device comprising an RF front end for receiving signals originating from navigation satellites, a baseband section receiving IF signals from the RF front end and generating one-millisecond correlation values, and a processor receiving correlation values from the baseband section, wherein the processor performs reacquisition of signals by:
    collecting, for each carrier frequency and PN code phase dwell within a selected frequency range and selected code phase range, a sequence of correlation values derived from signals originating from a navigational satellite;
    declaring a valid reacquisition at a selected dwell if a maximum power of the selected dwell exceeds a pre-determined high threshold value;
    declaring a valid reacquisition at the selected dwell if the maximum power of the selected dwell is below the pre-determined high threshold value, the maximum power of the selected dwell is above a pre-determined low threshold value, and the maximum power of the selected dwell is above a maximum power of all other dwells in the selected frequency range and selected code phase range.

19. The device of claim 18 wherein the predetermined high threshold value is selected based on a maximum received signal power level.

20. The device of claim 18 wherein the predetermined low threshold value is selected based on a receiver sensitivity level.

21. The device of claim 18 wherein the collecting comprises performing a search of PN code phase values within the selected code phase range, followed by a search of carrier frequency values within the selected frequency range.

22. The device of claim 21 wherein the search of carrier frequency values comprises searching frequency values spaced 1000 Hz or 1500 Hz apart.

23. The device of claim 21 wherein the search of carrier frequency values comprises determining a frequency search direction toward a frequency main lobe.

24. The device of claim 21 wherein the search of carrier frequency values comprises searching carrier frequency values in a range based on feedback from a position, velocity and time (PVT) computation.

25. A global satellite navigation receiver device comprising an RF front end for receiving signals originating from navigation satellites, a baseband section receiving IF signals from the RF front end and generating one-millisecond correlation values, and a processor receiving correlation values from the baseband section, wherein the processor performs reacquisition of signals by:
    collecting, for each carrier frequency and PN code phase dwell within a selected frequency range and selected code phase range, a sequence of correlation values derived from signals originating from a navigational satellite, wherein the collecting comprises performing a search of PN code phase values within the selected code phase range, followed by a search of carrier frequency values within the selected frequency range, and wherein the search of carrier frequency values comprises searching carrier frequency values in a range based on a duration of signal blockage and receiver dynamics;

declaring a valid reaquisition at a selected dwell if a maximum power of the selected dwell exceeds a pre-determined high threshold value; and declaring a valid requisition at the selected dwell if the maximum power of the selected dwell is below the pre-determined high threshold value, the maximum power of the selected dwell is above a pre-determined low threshold value, and the maximum power of the selected dwell is above a maximum power of all other dwells in the selected frequency range and selected code phase range.

26. A global satellite navigation receiver device comprising an RF front end for receiving signals originating from navigation satellites, a baseband section receiving IF signals from the RF front end and generating one-millisecond correlation values, and a processor receiving correlation values from the baseband section, wherein the processor performs reacquisition of signals by:

collecting, for each carrier frequency and PN code phase dwell within a selected frequency range and selected code phase range, a sequence of correlation values derived from signals originating from a navigational satellite, wherein the collecting comprises performing a search of PN code phase values within the selected code phase range, followed by a search of carrier frequency values within the selected frequency range, and wherein the search of carrier frequency values comprises searching carrier frequency values in a range based on duration of signal blockage, results of PVT computation, quality of the PVT results, and receiver dynamics;

declaring a valid reacquisition at a selected dwell if a maximum power of the selected dwell exceeds a pre-determined high threshold value: and declaring a valid reacquisition at the selected dwell if the maximum power of the selected dwell is below the pre-determined high threshold value, the maximum power of the selected dwell is above a pre-determined low threshold value, and the maximum power of the selected dwell is above a maximum power of all other dwells in the selected frequency range and selected code phase range.

27. The device of claim 21 wherein the search of PN code phase values comprises searching PN code phase values in a range based on feedback from a position, velocity and time (PVT) computation.

28. A global satellite navigation receiver device comprising an RF front end for receiving signals originating from navigation satellites, a baseband section receiving IF signals from the RF front end and generating one-millisecond correlation values, and a processor receiving correlation values from the baseband section, wherein the processor performs reacquisition of signals by:

collecting, for each carrier frequency and PN code phase dwell within a selected frequency range and selected code phase range, a sequence of correlation values derived from signals originating from a navigational satellite, wherein the collecting comprises performing a search of PN code phase values within the selected code phase range, followed by a search of carrier frequency values within the selected frequency range, and wherein the search of PN code phase values comprises searching PN code phase values in a range based on duration of signal blockage and receiver dynamics;

declaring a valid reacquisition at a selected dwell if a maximum power of the selected dwell exceeds a pre-determined high threshold value; and declaring a valid reacquisition at the selected dwell if the maximum power of the selected dwell is below the pre-determined high threshold value, the maximum power of the selected dwell is above a pre-determined low threshold value, and the maximum power of the selected dwell is above a maximum power of all other dwells in the selected frequency range and selected code phase range.

29. A global satellite navigation receiver device comprising an RF front end for receiving signals originating from navigation satellites, a baseband section receiving IF signals from the RF front end and generating one-millisecond correlation values, and a processor receiving correlation values from the baseband section, wherein the processor performs reacquisition of signals by:

collecting, for each carrier frequency and PN code phase dwell within a selected frequency range and selected code phase range, a sequence of correlation values derived from signals originating from a navigational satellite, wherein the collecting comprises performing a search of PN code phase values within the selected code phase range, followed by a search of carrier frequency values within the selected frequency range, and wherein the search of PN code phase values comprises searching PN code phase values in a range based on duration of signal blockage, results of PVT computation, quality of the PVT computation results, and receiver dynamics;

declaring a valid reacquisition at a selected dwell if a maximum power of the selected dwell exceeds a pre-determined high threshold value; and declaring a valid reacquisition at the selected dwell if the maximum power of the selected dwell is below the pre-determined hinh threshold value, the maximum power of the selected dwell is above a pre-detennined low threshold value, and the maximum power of the selected dwell is above a maximum power of all other dwells in the selected frequency range and selected code phase range.

30. The device of claim 18 further comprising determining the maximum power of the selected dwell by performing a frequency domain transformation of the sequence of correlation values for the selected dwell, and identifying a frequency domain component with maximum power.

31. The device of claim 18 further comprising confirming a valid reacquisition at the selected dwell if there is no PN code autocorrelation side lobe within a predetermined number of chips from the selected dwell.

32. The device of claim 18 wherein the high threshold value is derived from a power value of the signals prior to signal blocking.

33. The device of claim 18 wherein the high threshold value is derived from a predicted power value computed from a short term average power level of the signals prior to signal blocking.

34. The device of claim 18 wherein the high threshold value is derived from a predicted power value computed by extrapolating power levels of the signals prior to blockage.

* * * * *